July 27, 1954 W. W. BEMAN ET AL 2,685,082
POSITION INDICATING DEVICE
Filed March 28, 1951 4 Sheets-Sheet 1
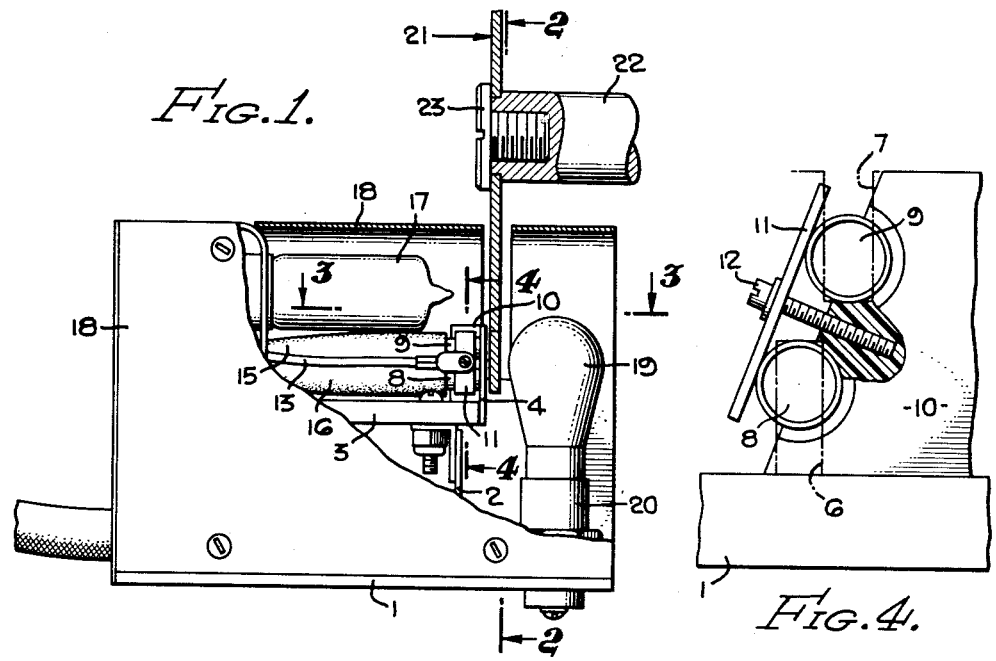
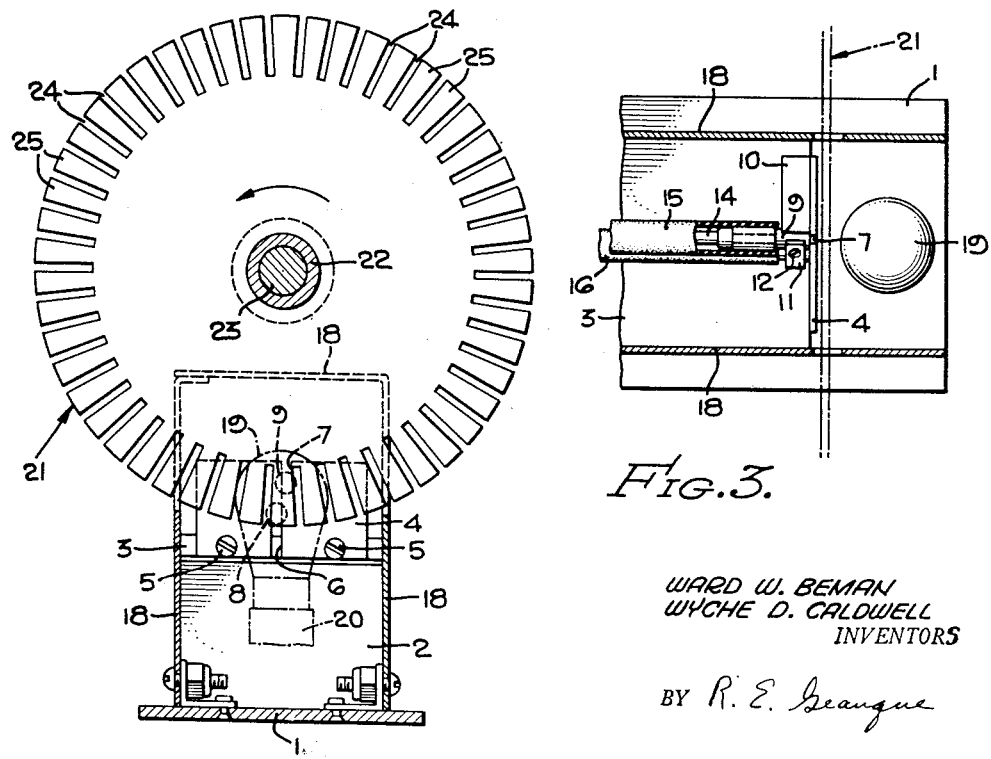
WARD W. BEMAN
WYCHE D. CALDWELL
INVENTORS
BY R. E. Geangue
ATTORNEY July 27, 1954  W. W. BEMAN ET AL  2,685,082
POSITION INDICATING DEVICE
Filed March 28, 1951  4 Sheets-Sheet 2
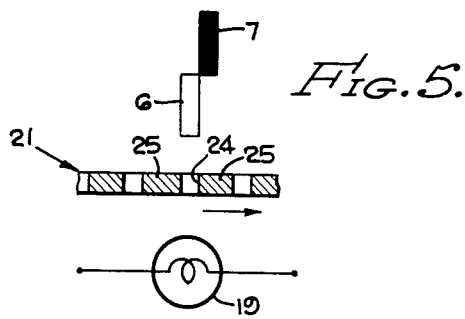
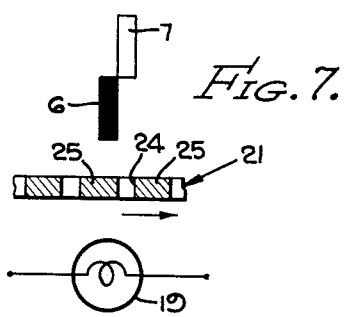
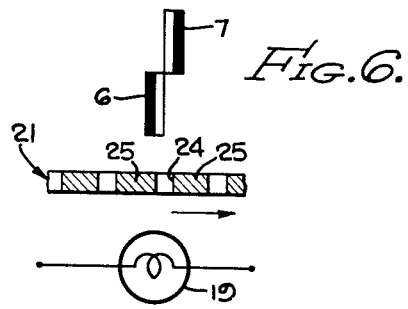
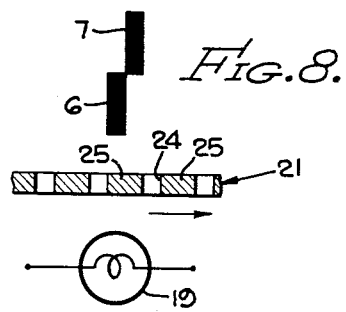
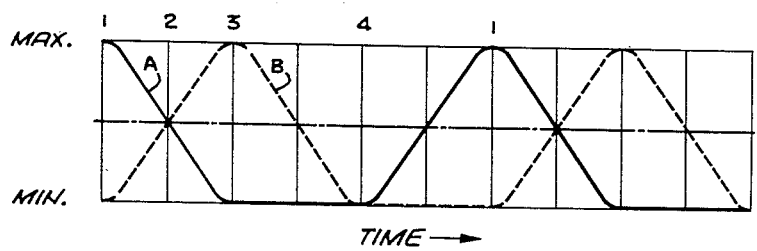
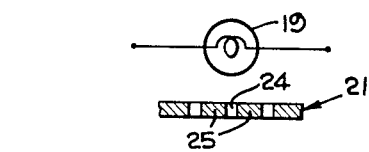
WARD W. BEMAN
WYCHE D. CALDWELL
INVENTORS
BY R. E. Geauque
ATTORNEY July 27, 1954

W. W. BEMAN ET AL 2,685,082

POSITION INDICATING DEVICE

Filed March 28, 1951

WARD W. BEMAN
WYCHE D. CALDWELL
INVENTORS

BY R. E. Geangue

ATTORNEY

July 27, 1954   W. W. BEMAN ET AL   2,685,082
POSITION INDICATING DEVICE
Filed March 28, 1951   4 Sheets-Sheet 4

WARD W. BEMAN
WYCHE D. CALDWELL
INVENTORS

BY R. E. Geanque

ATTORNEY

Patented July 27, 1954

2,685,082

UNITED STATES PATENT OFFICE 2,685,082

POSITION INDICATING DEVICE

Ward W. Beman, Glendale, and Wyche D. Caldwell, Sherman Oaks, Calif., assignors to Telecomputing Corporation, Burbank, Calif., a corporation of California Application March 28, 1951, Serial No. 217,978

14 Claims. (Cl. 340—271)

This invention relates to a position indicating device and more particularly to an instrument for deriving positional information from any movement and converting this information into digital form. This movement can be represented by rotational movement imparted to the indicating device and any particular rotational position imparted can represent a polar coordinate of an instrument or tracking device. Also, the rotational position imparted to the instrument can be derived from and represent the linear movement of various instruments or other mechanisms. The invention makes it possible to obtain at all times the exact position of any element whose function is being considered.

It has been the practice to follow the position of any element by utilizing its movement to cause rotation of a part of a counter and thereby obtain a count of increments of movement. In addition, in order to know in which direction the element was moving, it has been necessary to utilize in connection with the counter a mechanical arragement which required physical connection to the rotating parts of the counter. Such a connection imparted undesirable torque loadings on the rotating parts of the counter and certain lags had to be built into this physical connection to be sure that the directional information preceded the counting information. This physical means of determining direction was subject to frequent maladjustment and calibration of the counting instrument was continually necessary.

In order to overcome the disadvantages of prior devices, the present invention requires no additional physical connection with the rotational imput to the counter in order to determine the exact position of the element being followed. The directional information is obtained by two out-of-phase signals which are generated by the rotational part of the device. Since the signals are out-of-phase, one signal can be used for counting increments of movement and both signals in combination can be used for directional information. The direction of rotation imparted to the invention can be reversible so that the directional control signal can either lag or lead the counting signal.

A number of electrical gates are incorporated in the device of this invention to provide a means of passing only those directional signals which indicate to the counting means the proper direction of movement. By utilizing photo-electrical signals for counting the movement and for determining the direction of movement, it is apparent that there will be no torque loading on the instrument and the instrument can continue to determine position without interruption. Also, the invention provides a means of obtaining many counts per second because all the responses to rotational movement imparted to the device are completely electrical.

It is therefore an object of this invention to provide a means of continually indicating the position of any mechanism without lags in the indication resulting because of change of direction of the machine.

A further object of the invention resides in the fact that the direction of movement and position of any function can be determined by completely electrical means which has no appreciable inertia.

A still further object of the invention resides in means for generating signals for following the movement of any mechanism, which signals are out-of-phase in a direction corresponding to the direction of movement of the mechanism.

A further object of the invention is the provision of a series of electrical gates which are controlled by the generated signals and which provide means for determining the direction in which movement is taking place.

A still further object of the invention is to provide a device which can follow the movements of an element by simply converting these movements into rotational movement of a single part of the device. This rotational movement will provide means for deriving all information required to determine the position of the element.

These and other objects of the invention not specifically enumerated above will be apparent in the following specification and drawings in which:

Figure 1 is an elevational view of the reading head of this invention showing the photo-cells and rotating disk.

Figure 2 is a vertical section taken along line 2—2 of Figure 1 illustrating the slits in the rotating disk and the staggered position of the photo-cells.

Figure 3 is a horizontal sectional view taken along line 3—3 of Figure 1.

Figure 4 is a vertical sectional view taken along line 4—4 of Figure 1 illustrating the means for mounting the photo-cells.

Figure 5 illustrates one position of the rotating disk wherein one photo-cell receives maximum light and the other photo-cell receives no light.

Figure 6 illustrates the condition wherein each photo-cell is receiving approximately equal amounts of light.

3

Figure 7 represents another condition wherein one photo-cell receives maximum light and the other receives no light.

Figure 8 represents a condition where neither photo-cell is receiving light.

Figure 9 is a graphical illustration of the output of each photo-cell during rotation of the disk.

Figure 10 illustrates the circuit for one photo-cell and associated amplifier.

Figure 11:
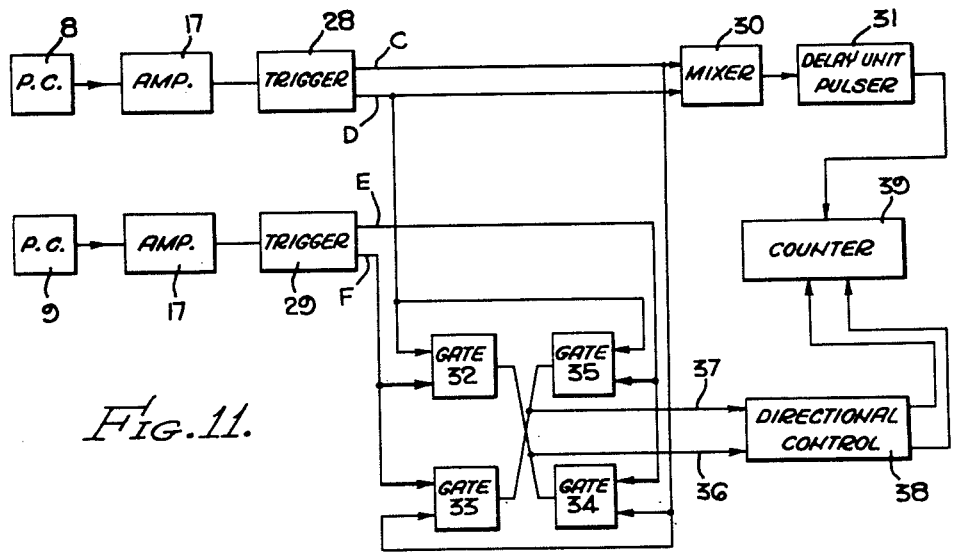

Figure 11 illustrates the circuit for utilizing the output of the photo-cells to indicate position.

Figure 12:
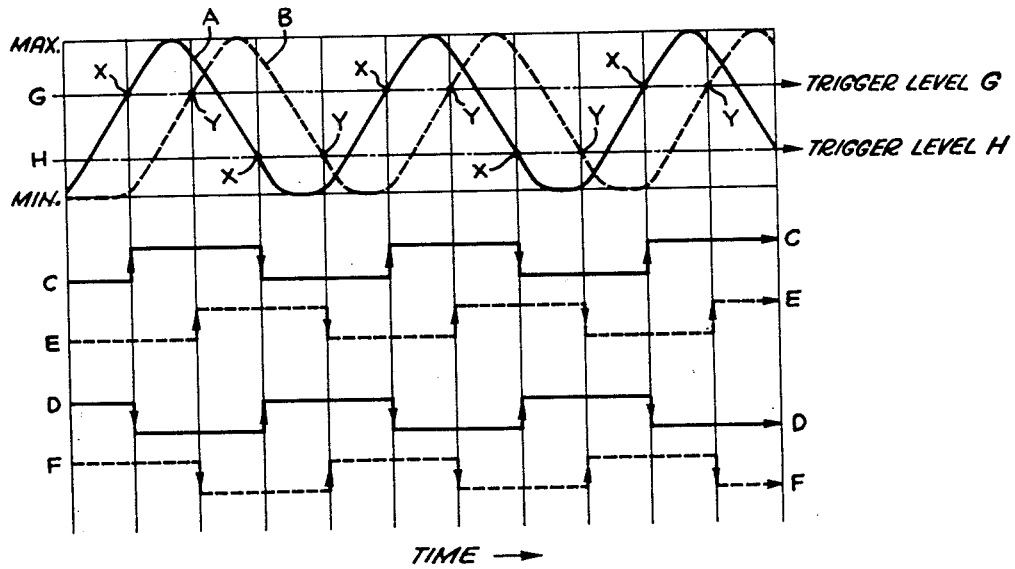

Figure 12 illustrates the output of triggers which are connected to each photo-cell and also the position of the trigger levels in relation to the output curves of the photo-cells.

Figure 13:
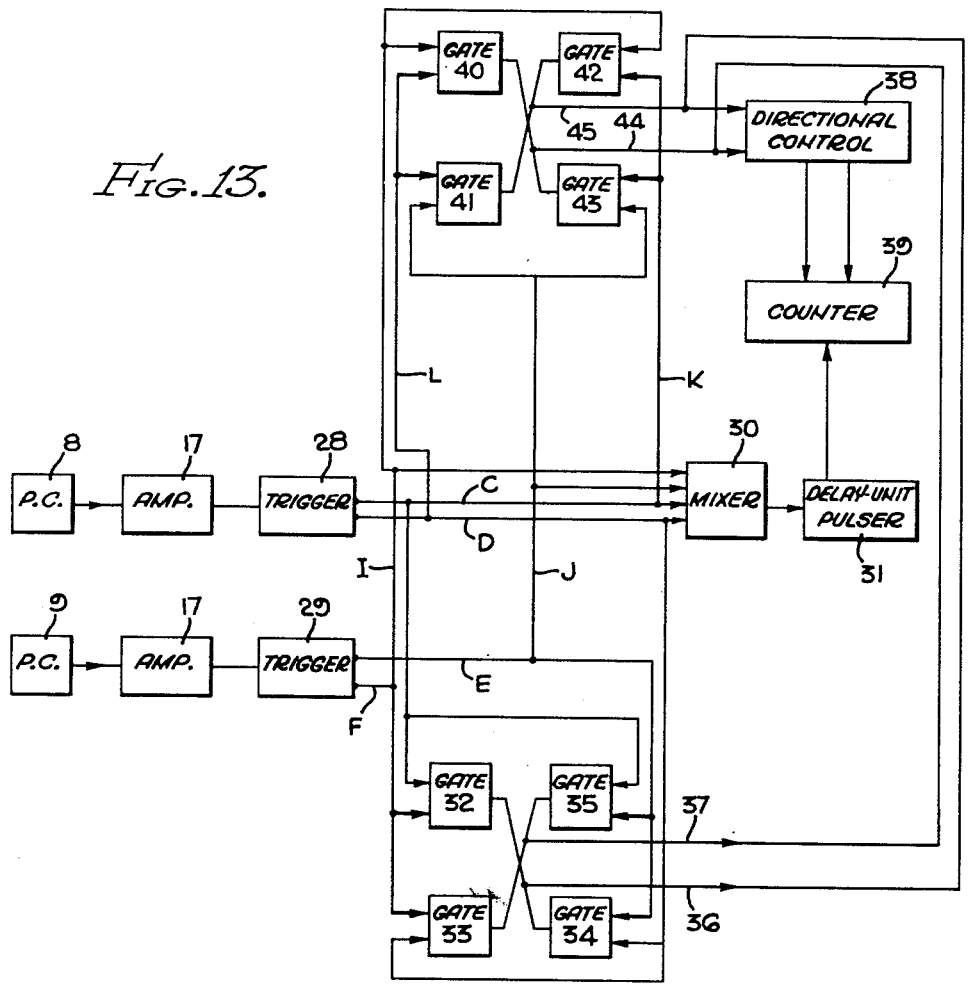

Figure 13 shows the circuit utilized to double the number of counts received from the two photo-cells.

The embodiment of the present invention chosen for illustration contains a split disk type reading head which is generally shown in Figure 1. The reading head has a base plate 1 to which is secured a support bracket 2 which serves to support a mounting plate 3. A light shield 4 is secured to the end of mounting plate 3 by screws 5. This light shield contains two slits 6 and 7 which are offset from one another, with the inner edges of both slits being in the same line. As shown in Figure 2, the slit 7 communicates with the upper edge of light shield 4 while slit 6 communicates with the lower edge of the light shield. A photo-cell 8 is positioned directly behind slit 6 and a photo-cell 9 is positioned directly behind slit 7. Both of these photo-cells are mounted on a Bakelite member 10 carried by mounting bracket 3. The photo-cells are held in position against the Bakelite member by plate 11 extending across the outer surface of both photo-cells and the plate receives a screw 12 which passes between the photo-cells and into the Bakelite member 10. A lead 13 communicates with plate 12 and is utilized as one of the leads for both the photo-cells. The photo-cell 9 has an output lead 14 which is surrounded by a rubber tube 15 to protect it from external electrical contact. The photo-cell 8 has a similar output lead (not shown) which is likewise surrounded by a rubber tube 16. The leads from both of the photo-cells pass to the amplifier 17 where the signals from each photo-cell are amplified sufficiently to be of further use. The entire photo-cell assembly is surrounded on three sides by thin shields 18 which are carried by base plate 1. The electrical circuit for photo-cell 8 is illustrated in Figure 10 and a single source of electrical energy 26 is utilized for both the photo-cell 8 and the amplifier 17. The output of the photo-cell is shown directly connected to the grid 27 of the amplifier. The circuit for photo-cell 9 is exactly the same and it is understood that the output of both photo-cells can be amplified by a single tube of the twin type.

A source lamp 19 is carried by a socket 20 in base plate 1 and is positioned directly in front of the photo-cells at a slight distance from the photo-cells. A circular disk 21 is mounted on a rotating shaft 22 by means of screw 23 and the disk is so positioned that a portion of its circumference is placed between the lamp source 19 and the photo-cells. The circumference of the disk contains a series of radial slits 24 which are spaced apart by disk segments 25. The slits 24 communicate with the outer edge of disk 21 and are of such length that they will allow both

4 photo-cells to come into view of the lamp source 19, and the circumference of disk 21 is so positioned that the segments 25 are capable of disrupting the view of lamp 19 by both photo-cells. The width of each slit 24 is approximately equal to the width of slits 6 and 7 and the effective width of each segment 25 is approximately twice the width of any of these slits. It is therefore apparent from Figure 2 that in one position of the disk, slits 6 and 7 will both be shielded from the light source by a single segment. If the disk 21 is rotated, each photo-cell will receive varying amounts of light and since the photo-cells are placed behind staggered slits 6 and 7, the time at which each photo-cell receives a maximum amount of light will be different.

The various positions of the disk 21 with respect to slits 6 and 7 are illustrated in Figures 5 through 8, wherein the shaded portions of each slit represent the ineffective portion of each photo-cell and the arrows represent the direction of movement of the disk. In Figure 9 are shown the voltage curves A and B for photo-cells 8 and 9 respectively which result from the rotation of the disk 21 in front of the photo-cells. In Figure 5 the slit is shown directly in front of slit 6 and photo-cell 8 is receiving a maximum amount of light. At the same time segment 25 cuts off the view of the light source by photo-cell 9. Therefore, the voltage generated by each photo-cell is illustrated at Time 1 on each of the A and B curves. After the disk has moved a distance equal to half the width of the slits, the disk will be positioned with respect to slits 6 and 7 in the manner shown in Figure 6. In this position, the photo-cells 8 and 9 will each receive approximately half of the light passing through slit 24 and approximately half of the area of each slit will be blanked off by segments 25 on each side of the slit. The voltage generated by each photo-cell under this condition is illustrated at Time 2 on the A and B curves. In Figure 7 the disk 21 has again moved the distance equal to half the slit width and a slit 24 is directly in front of slit 7. In this condition, photo-cell 9 will receive a maximum amount of light and photo-cell 8 will be cut off from the light source by the segment 25 directly following the slit. This condition is represented at the Time 3 on the curves of Figure 9. When the disk moves a distance of another half slit into the position shown in Figure 8, the segment 25 following slit 24 will tend to completely cut off both photo-cells from the light source and the output of both photo-cells, corresponding to the position of Figure 8, is illustrated at Time 4 on the curves A and B of Figure 9. Further movement of the disk from its position in Figure 8 will move the segment 25 so that photo-cell 8 will again receive some light.

It is understood that the curves shown in Figure 9 are somewhat theoretical and that the actual curves resulting from movement of the disk will approach a more sinusoidal shape because of the fact that there will be some dispersion of the light rays under the conditions illustrated in Figures 5 through 8 and under various other conditions. Also, the particular ratio of slit widths and the ratio of the segment widths to slit widths can be varied to modify the shape of the curves obtained if so desired. For instance, the width of slits 6 and 7 can be made slightly less than the widths of slits 24 in order to level off the peaks of the A and B curves. Because of the direction in which disk 21 has been moved, it is apparent that curve A for photo-cell 8 will lead curve B for photo-cell 9. However, if the direction of rotation of disk 21 is reversed, it is apparent that curve B for photo-cell 9 will lead curve A for photo-cell 8 since photo-cell 9 will see light from a particular slit before photo-cell 8. It is therefore possible to use photo-cell 8 as a means of counting the number of slits which move past it and to use photo-cell 9 to determine the direction in which the disk is moving. The maner in which the signals from the two photo-cells is utilized for directional counting is illustrated in Figure 11.

The photo-cells 8 and 9 are shown in Figure 11 connected through amplifier 17 to triggers 28 and 29 respectively, which triggers are commonly known as Schmitt triggers and are illustrated at page 100, Figure 2.37 in "Electronics, Experimental Techniques" by William C. Elmore and Mathew Sands, first edition (1949). These triggers are of the bi-stable flip-flop type which have two input voltage levels through which the triggering voltage must pass in order to accomplish the desired action. These trigger levels are indicated by lines G and H applied to the curves A and B of Figure 12 which illustrates respectively the actual voltage output of photo-cells 8 and 9 after amplification. It is understood that the output of photo-cells 8 and 9 are connected to only one tube of the triggers 28 and 29 respectively. When the voltage of photo-cell 8 rises to level G, the connected tube of trigger 28 will start to conduct and will remain in conducting condition until the voltage of photo-cell 8 passes through its maximum and returns to trigger level H. On curve A, the X points represent the triggering points for this tube. The output of the connected tube is therefore illustrated by curve C of Figure 12. When the connected tube of trigger 28 ceases to conduct, the other tube of the trigger will start to conduct and will remain conducting until the voltage of photo-cell 8 again rises to trigger level G. The voltage output of the other tube is therefore illustrated by curve D of Figure 12 and it is seen that the usual trigger action has resulted in that only one tube of the trigger is conducting at any given time.

The dashed curve B of Figure 12 illustrates the amplified voltage output of photo-cell 9 and when this output reaches trigger level G, the connected tube of trigger 29 will start to conduct and will remain conducting until the voltage of photo-cell 9 returns to trigger level H. The curve E of Figure 12 illustrates the output voltage of the connected tube of trigger 29 and points Y on curve B designate the triggering points. When the connected tube ceases to conduct, the other tube of the trigger will be in conducting condition until the voltage of photo-cell 9 again rises to trigger level G. The curve F illustrates the voltage output of the non-connected tube of trigger 29. It is apparent that one cycle of each photo-cell will cause one positive going pulse and one negative going pulse in each line leading from the connected trigger.

Referring again to Figure 11, the lines C, D, E and F carry the output of triggers 28 and 29 and the output of each line corresponds to the curve shown in Figure 12 of similar designation. Both lines C and D are directly connected to a mixer 30 which allows the signals in either line to pass through the delay unit pulser 31 and on to the counter 39. Thus, both the signals in line C and D can be used to count the number of slits 24 which pass by the photo-cell 8 since two positive counting pulses will be received from each slit by the photo-cell. The mixer 30, commonly known as an Adder, can be of the type which utilizes tubes in the manner illustrated in Figure 18.12 at page 641 of "Waveforms," volume 19 of Radiation Laboratory Series of Massachusetts Institute of Technology, first edition (1949). Other types of mixers which utilized resistors, capacitors or diodes can equally well be used. The delay unit pulser 31 can be in the form of a monostable multivibrator, of which there are numerous types, a typical one being illustrated in Fig. 5.10, page 168 of the reference cited directly above.

The output of lines E and F coming from photo-cell 9 can be used to determine which direction the disk is rotating during the time the pulses from photo-cell 8 are being counted. A series of four gates 32, 33, 34 and 35 are utilized for this purpose and the voltage level of line F is used to control gates 32 and 33 while the voltage level of line E is used to control gates 34 and 35. Also line D is connected to gates 32 and 35 while line C is connected to gates 33 and 34. The gates 32 and 34 have a common output line 36 and the gates 33 and 35 have a common output line 37. These lines lead to the directional control unit for the counter and then to the interstages of the counter where the signals control the bias level of two gates at each interstage.

The operation of the directional control gates would be more readily understood in connection with Figure 12. A typical construction for such gates is shown in Figure 10.16, page 379 of the reference entitled "Waveforms" cited above, where the imputs from trigger 29 would be connected directly to voltage source Eg3 in the illustration. When the voltage level of line E jumps to its high positive level, the gates 34 and 35 will be in a condition to conduct. If a negative going pulse is received in line C from trigger 28, the pulse cannot pass through the gate 34 and on to the directional control unit since the gates respond to positive pulses only. However, at the same time line D will receive a positive going pulse which will be allowed to pass through gate 35 to line 37 and on to unit 38. Since the line F will be at low voltage during the time line E is at high voltage, no pulses can pass through gates 32 or 33. However, when line F goes to its high positive level then gates 32 and 33 are conditioned to conduct, and a positive going pulse in line C will pass through gate 33 and the negative going pulse in line D will not be able to pass through gate 32. Therefore, another pulse will pass through line 37 to the directional control unit. It is therefore apparent that when the disk 21 is rotating in a direction so that curve A of photo-cell 8 leads curve B of photo-cell 9, all directional pulses received by control unit 38 will come from line 37. This results when line F is at high voltage and line C received a positive going pulse or when line E is at high voltage and line D receives a positive going pulse.

If the direction of rotation of disk 21 is reversed, the curve B for photo-cell 9 would then lead the curve A for photo-cell 8. In this condition, when line E is at its high voltage, gates 34 and 35 become conductive. Because of the change in phase of the curves A and B, line C will receive a positive going pulse and line D will receive a negative going pulse at this time. Therefore, gate 34 will allow the positive going pulse of line C to pass on through line 36 to the directional control unit while the negative going pulse of line D cannot pass gate 35. During this time line F will be at low voltage and gates 32 and 33 will be non-conductive. However, when line F is at its high voltage and line E at low voltage, gates 32 and 33 will be made conducting. At this time line D will receive a positive going pulse from trigger 28 and will pass through gate 32 to line 36 and to unit 38. Line C will have a negative going pulse and will not be able to pass through gate 33. It is therefore apparent that when disk 21 is rotating in the reversed direction, that all directional control pulses will pass through line 36. When line E is at the high conducting voltage, a positive going pulse in line C will pass through gate 34 and line 36 and when line F is at a conducting voltage, the positive going pulse in line D will pass through gate 32 to line 36.

Since, for a given direction of rotation of disk 21, the directional control pulses can only pass through one of the lines 36 or 37, the control pulse in this one line will open the proper gate at each interstage of the counter 39 so that the pulse coming from the delay unit pulser 31 can be made to count in the proper direction. The delay unit pulser 31 will delay the pulse from mixer 30 until the pulse from the directional control unit 38 has had time to open the proper interstage counting gates. The directional control unit 38 can utilize a bi-stable trigger cathode follower output such as shown in Figure 5.4, page 164 of the reference entitled "Waveforms," cited above, with the two imputs to V3 and V4 separated instead of joined. While the positive going pulses have been described as the counting pulses, it is contemplated that the negative pulses could be used for the same purpose. Also, the phase relationship of the amplified photo-cell curves is not critical as long as the curves are not 180 degrees out-of-phase.

It will be obvious that the number of counts obtained from each slit in the rotating disk can be doubled without increasing the number of photocells in use. In order to accomplish this result, four more gates 40, 41, 42 and 43 can be added to the circuit of Figure 11 in the manner shown in Figure 13. In this circuit, the voltage pulses from trigger 29 are also added to mixer 30 through lines I and J respectively. Therefore, a total of four counting pulse lines are led to the mixer 30 instead of only the two leading from trigger 28. The voltage levels of gates 40 and 41 are controlled by line L which connects with line D of trigger 28 and the voltage levels of gates 42 and 43 are controlled by line K which is connected with line C of trigger 28. Therefore, when a positive going pulse is obtained in line E, the line C will have jumped to its positive high level and the pulse from line E will be allowed to pass through gate 43 to line 44. At the same time a negative going pulse in line F will not be able to pass gate 42. Thus, only the pulse from gate 43 will be able to pass to line 44 and then to the directional control unit 38. However, when the line F receives a positive going pulse, the line D will have previously jumped to its high positive level and the gates 40 and 41 will be in condition to conduct and this positive going pulse can pass through gate 40 and on to line 44. At this time gate 41 will not pass the negative going pulse in line E and gates 42 and 44 will not be opened since line C will be below firing potential. During the period that line 44 receives directional pulses, line 37 will also be receiving alternate directional pulses indicating the same direction of movement and directional control will be available for all four of the positive pulses received at the mixer 30. If the direction of rotation of disk 21 is reversed, the gates 32 and 35 and gates 41 and 42 will pass the directional pulses to lines 36 and 45 respectively and again directional control pulses indicating the reverse direction will be available for each pulse received by the mixer.

The device incorporating this invention can obviously follow the function of any machine or instrument which is of interest and by imparting this function to the disk 21 as rotational movement, it becomes possible to determine the position representing the function at any time. By sending the signals developed by the invention to a suitable type of counter, a digital count of position can be always available since the direction of counting can be quickly reversed. If desired, the position of a number of machine elements can be obtained simultaneously by using separate devices to follow each element. It is apparent that the use of the generated signals is not limited to indicating means since the signals can be utilized in a number of other ways, such as in connection with servo mechanisms. While the invention has been described as incorporating photo-cells to produce signals, it is contemplated that any other suitable type of light-sensitive device can be utilized for this purpose. Various other modifications are contemplated and may obviously be resorted to by those skilled in the art without departing from the spirit and scope of the invention, as hereinafter defined by the appended claims.

What is claimed is:

1. A device for determining the position of an element movable in more than one direction, comprising means operated by said element for generating two out-of-phase signals, means for obtaining simultaneous positive and negative going pulses from one of said signals, means for generating simultaneous high and low voltage levels from the other of said signals, means operated by the said pulses of said one signal to count total movement of said element, and means responsive to said voltage levels and said pulses for determining the direction of movement of said element.

2. A device for determining the position of an element capable of movement in more than one direction, comprising means controlled by said element for generating at least two out-of-phase signals, means operated by each of said signals for generating a series of simultaneous positive and negative going pulses followed respectively by high and low voltage reference levels, the pulses derived from one signal being out-of-phase with the pulses derived from the other signal, means for counting said pulses to determine total movement of said element and means for combining the pulses from one signal with the voltage level from the other signal to determine the direction of movement of said element.

3. A device for determining the position of an element capable of movement in more than one direction comprising means activated by the movement of said element for producing two out-of-phase electrical signals, trigger means operated by each of said signals to simultaneously produce two separate wave forms, the wave forms produced by one trigger means being out-of-phase with those produced by the other trigger means, means for counting the positive going pulses from each trigger, and gate means under control of both triggers for determining the direction of movement of said element during each count.

4. A device as defined in claim 3 wherein said gate means are opened by the voltage level of the wave forms of one trigger means to allow only the positive going pulses of the wave forms of the other trigger means to pass.

5. In a device for generating signals in response to movement of an element movable in more than one direction, a member moved in response to movement of said element, a series of openings placed in said member, a pair of staggered photo-cells positioned on one side of said member and a source lamp positioned on the other side of said member, said openings being positioned in said member to allow first one photo-cell and then the other to receive maximum illumination through a single opening during movement of said single opening past said source lamp.

6. In a device for generating signals in response to movement of an element, a circular disk rotated during movement of said element, a series of slits placed in said disk in a circular path concentric with the center of said disk, a pair of photo-cells placed on one side of said disk and a light source positioned on the other side of said disk, said photo-cells being staggered so both photo-cells can be partially illuminated simultaneously by light from a single slit during rotation of said disk.

7. In a device for generating signals in response to movement of an element, a circular disk rotated during movement of said element, a series of slits of equal width placed in said disk and separated by disk segments of approximately twice the width of each slit, a pair of photo-cells placed on one side of said disk and a light source positioned on the other side of said disk, a light shield positioned between said disk and said photo-cell and containing two slits each approximately equal in width to the slits in said disk, each shield slit being positioned to illuminate only one photo-cell, said shield slits being staggered so that both slits can be darkened at the same time by a single disk segment in only one segment position and both photo-cells cannot receive maximum light at the same time during rotation of said disk.

8. In a device for generating signals in response to movement of an element, a circular disk rotated during movement of said element, a series of slits placed in said disk in a circular path concentric with the center of said disk, said slits being separated by segments of said disk, a single light source positioned on one side of said disk, a pair of photo-cells positioned opposite said light source on the other side of said disk so that each of said photo-cells can be illuminated by light passing through a single slit during rotation of said single slit past said source, said photo-cells being staggered along the circumference of said disk so that one photo-cell receives light from a single slit before the other during rotation of said disk.

9. In a device for generating signals in response to movement of an element movable in more than one direction, a member moved in response to movement of said element, a series of openings placed in said member, a single light source on one side of said member positioned to project light through the opening adjacent said light source, a pair of photo-cells positioned opposite said light source on the other side of said member, said photo-cells being staggered with respect to said light source so that said photo-cells receive light from a single opening during different portions of the movement of said single opening past said light source and thereby develop out-of-phase signals.

10. In a device for generating signals in response to movement of an element movable in more than one direction, a member movable in response to movement of said element, a series of openings placed in said member, a single light source positioned adjacent one side of said member to project light through each opening as it moves past said source, a pair of photo-cells positioned opposite said light source on the other side of said member so that each photo-cell is illuminated by a single opening as it passes said light source, said photo-cells being staggered with respect to the direction of movement of said openings so one photo-cell is illuminated before the other during rotation of said member in order to produce out-of-phase signals from said photo-cells.

11. In a device for determining the position of an element, a circular disk rotated during movement of said element, a series of slits of equal width placed in said disk and separated by disk segments of approximately twice the width of each slit, a pair of photo-cells place on one side of said disk and a light source positioned on the other side of said disk, a light shield positioned between said disk and said photo-cells and containing two slits each approximately equal in width to the slits in said disk, each shield slit being positioned to illuminate only one photo-cell, said shield slits being staggered so that both slits can be darkened at the same time by a single disk segment in only one segment position and both photo-cells cannot receive maximum light at the same time during rotation of said disk, means connecting each photo-cell to one tube of a trigger means to cause first one tube and then the other tube of each trigger means to conduct, a number of electrical gates connected to said trigger means, said gates receiving pulses from one trigger means and having the firing potential controlled by the other trigger means, and counting means connected with said trigger means and said gates to give a digital count representing the position of said element.

12. In a device for generating signals in response to movement of an element movable in more than one direction, a member moved in response to movement of said element, a series of openings placed in said member, a pair of staggered light-sensitive means positioned on one side of said member and a source lamp positioned on the other side of said member, said openings being positioned in said member to allow first one light-sensitive means and then the other to receive maximum illumination through a single opening during movement of said single opening past said source lamp.

13. In a device for generating signals in response to movement of an element movable in more than one direction, a member moved in response to movement of said element, a series of openings placed in said member, a single light source on one side of said member positioned to project light through the opening adjacent said light source, a pair of light-sensitive devices positioned opposite said light source on the other side of said member, said devices being staggered with respect to said light source so that said devices receive light from a single opening during different portions of the movement of said single opening past said light source and thereby develop out-of-phase signals.

14. In a device for determining the position of an element movable in more than one direction, a member moved in response to movement of said element, a series of openings placed in said member, a single light source on one side of said member positioned to project light through the opening adjacent said light source, a pair of light-sensitive devices positioned opposite said light source on the other side of said member, said devices being staggered with respect to said light source so that said devices receive light from a single opening during different portions of the movement of said single opening past said light source and thereby develop out-of-phase signals, and means operated by said devices to indicate the position of said element.

References Cited in the file of this patent

UNITED STATES PATENTS

| Number | Name | Date |
|---|---|---|
| 2,082,038 | West et al. | June 1, 1937 |
| 2,376,459 | Stevens | May 22, 1945 |
| 2,537,427 | Seid et al. | Jan. 9, 1951 |

FOREIGN PATENTS

| Number | Country | Date |
|---|---|---|
| 515,212 | Great Britain | Nov. 29, 1939 |